United States Patent
Kersting

(10) Patent No.: US 8,465,386 B2
(45) Date of Patent: Jun. 18, 2013

(54) SEMI-POWER SPLIT HYBRID TRANSMISSION WITH MULTIPLE MODES AND FIXED GEARS

(75) Inventor: Klaus Kersting, Birmingham, MI (US)

(73) Assignees: Chrysler Group LLC, Auburn Hills, MI (US); Daimler AG, Stuttgart (DE)

( * ) Notice: Subject to any disclaimer, the term of this patent is extended or adjusted under 35 U.S.C. 154(b) by 1428 days.

(21) Appl. No.: 12/113,992

(22) Filed: May 2, 2008

(65) Prior Publication Data

US 2009/0275439 A1     Nov. 5, 2009

(51) Int. Cl.
*F16H 3/72*     (2006.01)

(52) U.S. Cl.
USPC ............................................................. 475/5

(58) Field of Classification Search
USPC ............................................................. 475/5
See application file for complete search history.

(56) References Cited

U.S. PATENT DOCUMENTS

| | | | |
|---|---|---|---|
| 4,920,828 A | 5/1990 | Kameda et al. | |
| 5,690,578 A | 11/1997 | Hall | |
| 7,374,506 B2 * | 5/2008 | Bucknor et al. | 475/5 |
| 2003/0078126 A1 | 4/2003 | Holmes et al. | |
| 2006/0046886 A1 * | 3/2006 | Holmes et al. | 475/5 |

* cited by examiner

*Primary Examiner* — Jeffrey J Restifo
*Assistant Examiner* — Erez Gurari
(74) *Attorney, Agent, or Firm* — Ralph Edwin Smith

(57) ABSTRACT

The present disclosure provides a semi-power split transmission with multiple Electric Variable Transmission (EVT) modes and fixed gears for use in hybrid electrical vehicles (HEV). The present disclosure utilizes two electric motors ("E-motors"), an engine, and two planetary gear sets. The planetary gear sets can include a dual-sun Ravigneaux-type gear set (DS-RGS), a dual-ring Ravigneaux-type gear set (DR-RGS), a three-sun Ravigneaux-type gear set (TS-RGS), and a normal planetary gear set (PGS). The E-motors can be placed at the front end of the transmission, with one E-motor at the front and one in the middle between the gear sets, and with both E-motors in the middle between the gear sets.

7 Claims, 13 Drawing Sheets

| gears | Clutch 1 36 | Clutch 2 38 | Clutch 3 40 | Brake 1 42 | Brake 2 44 | Brake 3 46 | Ratio |
|---|---|---|---|---|---|---|---|
| FG1 | x | | | x | x | | 4.1 |
| FG2 | | | x | x | x | | 2.6 |
| FG3 | x | | x | x | | | 1.7 |
| FG4 | | x | x | x | | | 1.3 |
| FG5 | x | x | x | | | | 1.0 |
| FG6 | x | x | | x | | | 0.7 |
| FG-R | x | | | x | | x | -2.9 |

| Mode | Clutch 1 36 | Clutch 2 38 | Clutch 3 40 | Brake 1 42 | Brake 2 44 | Brake 3 46 |
|---|---|---|---|---|---|---|
| EVT1 | x | | | | x | |
| EVT2 | | | x | | x | |
| EVT3 | | x | x | | | |
| EVT4 | x | x | | | | |
| EVT5 | x | | x | | | |
| EVTR | x | | | | | x |

SEMI-POWER SPLIT HYBRID TRANSMISSION WITH MULTIPLE MODES AND FIXED GEARS

FIELD OF THE DISCLOSURE

The present disclosure relates generally to vehicle transmissions, and more specifically, the present disclosure relates to a semi-power split transmission capable of multiple Electric Variable Transmission (EVT) modes and having fixed gears for hybrid electrical vehicles (HEV).

BACKGROUND OF THE DISCLOSURE

A Power Split Transmission (PST) (also known as an Electric, Variable Transmission (EVT)) is one type of transmission used for Hybrid Electric Vehicles (HEVs). Power split transmissions utilize two electric motors ("E-motors") and require completely new transmission designs over conventional transmissions and existing HEV transmissions with a single E-motor. Power split transmissions, utilize epicyclic differential gearing (i.e., planetary gear sets) in a way that a part of the power of an internal combustion engine is transmitted through a mechanical path to the output, and another part is transmitted on an electrical path. The electrical path includes two E-motors, one of them operating as a motor and the other as a generator. Variable transmission ratios can be obtained by varying the speeds of the E-motors.

Typically, the PST allows no carryover of parts from conventional transmissions resulting in large development costs. However, HEVs with PST transmissions provide improved fuel economy over traditional series and parallel hybrids because the E-motors not only boost or regenerate during braking, but also drive in variable ratios. Those operations are done in EVT modes. Conventional geared transmissions have a certain number of gears (e.g., four to seven) with fixed ratios. Variable ratios in the EVT modes allow the engine to operate near the best efficient load point. In existing HEV PSTs, high power E-motors and power electronics are required in order to cover full load engine operation. In existing HEV PSTs, not all engine loads and speeds can be covered by the EVT modes. Further, existing HEV PSTs require high E-motor power, lack reverse torque, and include a small number of fixed gears.

BRIEF SUMMARY OF THE DISCLOSURE

In various exemplary embodiments, the present disclosure provides a semi-power split transmission with multiple Electric Variable Transmission (EVT) modes and fixed gears for use in hybrid electrical vehicles (HEVs). The present disclosure utilizes two electric motors ("E-motors"), an engine, and two planetary gear sets. The semi-power split transmission relies on fixed gears at high and full load operation. Accordingly, the E-motors are smaller and less expensive. In various exemplary embodiments, the planetary gear sets can include a dual-sun Ravigneaux-type gear set (DS-RGS), a dual-ring Ravigneaux-type gear set (DR-RGS), a three-sun Ravigneaux-type gear set (TS-RGS), and a normal planetary gear set (PGS). The E-motors can be placed at the front end of the transmission, with one E-motor at the front and one in the middle between the gear sets, or with both E-motors in the middle between the gear sets.

In an exemplary embodiment of the present disclosure, a semi-power split hybrid transmission capable of operation in a plurality of Electric Variable Transmission modes and with fixed gears includes an engine connected to an input shaft; a first dual-sun planetary gear set connected to the input shaft, a first selectively engageable brake, a first selectively engageable clutch, an overrunning clutch, and a first electric motor; and a second dual-sun planetary gear set connected to, an output shaft, a second selectively engageable brake, a second and third selectively engageable clutch, the overrunning clutch; and a second electric motor; wherein the first and second electric motor are disposed between the first and second dual-sun planetary gear sets. The first dual-sun planetary gear set includes a first normal sun gear, a first compound sun gear, a first ring gear, a first long set of planetary pinions meshing with the first compound sun gear, a first short set of planetary pinions meshing with the first normal sun gear and the first long set of planetary pinions, and a first planetary carrier common to both the first long and short set of planetary pinions. The second dual-sun planetary gear set includes a second normal sun gear, a second compound sun gear, a second ring gear, a second long set of planetary pinions meshing with the second compound sun gear, a second short set of planetary pinions meshing with the second normal sun gear and the second long set of planetary pinions, and a second planetary carrier common to both the second long and short set of planetary pinions.

In another exemplary embodiment of the present disclosure, a semi-power split hybrid transmission capable of operation in a plurality of Electric Variable Transmission modes and with fixed gears includes an engine connected to an input shaft; a first planetary gear set connected to the input shaft, a first selectively engageable brake, a first selectively engageable clutch, and a first electric motor; and a second planetary gear set connected to an output shaft, a second selectively engageable brake, a second and third selectively engageable clutch, and a second electric motor. The first electric motor is disposed before the first planetary gear set, and the second electric motor is disposed between the first and second planetary gear sets.

In yet another exemplary embodiment of the present disclosure, a semi-power split hybrid transmission capable of operation in a plurality of Electric Variable Transmission modes and with fixed gears includes an engine connected to an input shaft; a first planetary gear set and second planetary gear set connected to a first and second electric motor, the input shaft, a first and second selectively engageable brake, and a first, second, and third selectively engageable clutch; an output shaft connected to the second planetary gear set. The first and second electric motors are disposed before the first planetary gear set.

BRIEF DESCRIPTION OF THE DRAWINGS

The present invention is illustrated and described herein with reference to the various drawings, in which like reference numbers denote like system components, respectively, and in which.

DETAILED DESCRIPTION OF THE DISCLOSURE

Figure 1:
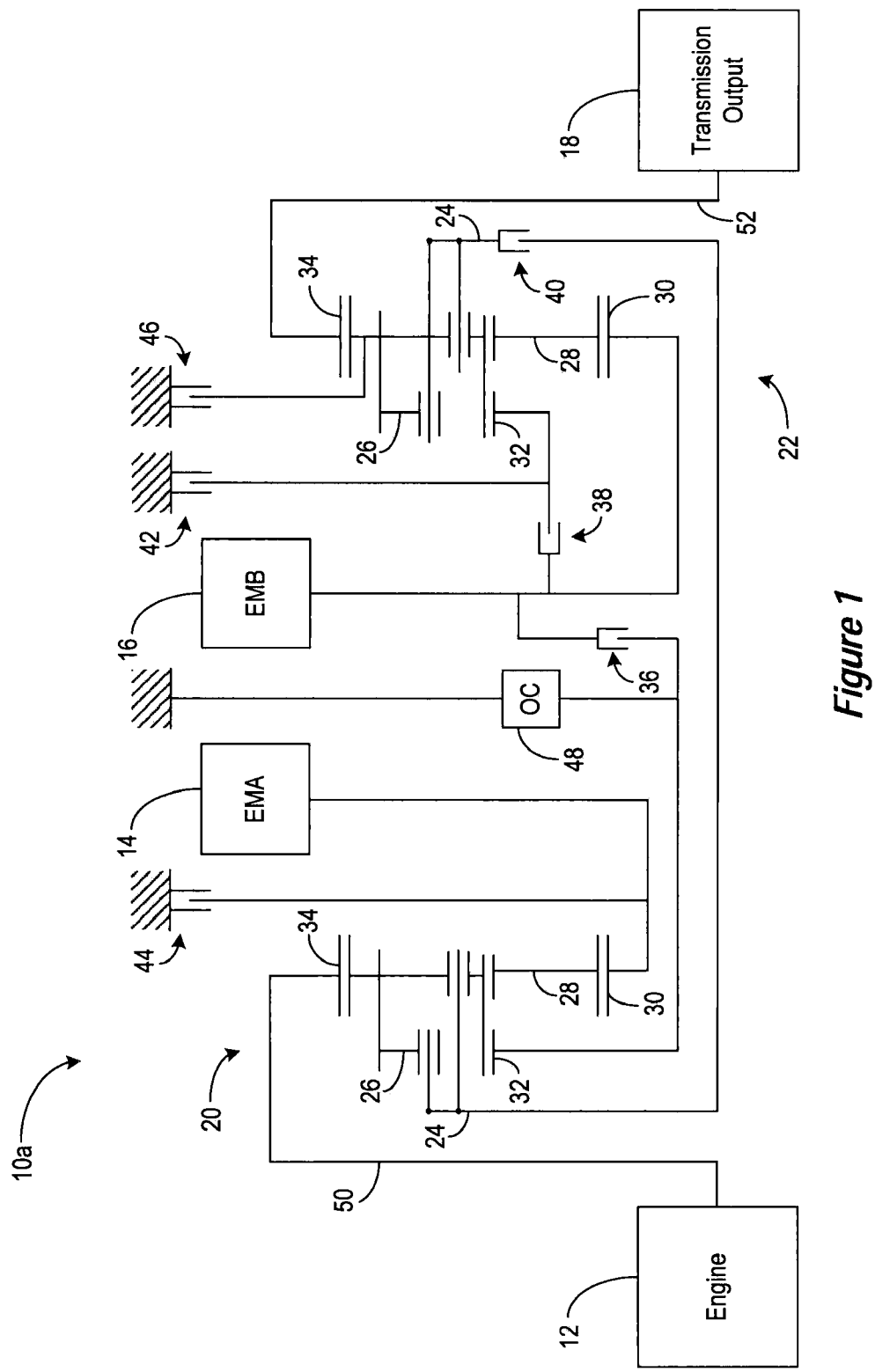
FIG. 1 is a schematic diagram of an exemplary embodiment of a semi-power split transmission including two E-motors located in between two dual-sun RGSs.

In various exemplary embodiments, the present disclosure provides a semi-power split transmission with multiple Electric Variable Transmission (EVT) modes and fixed gears for use in hybrid electrical vehicles (HEVs). The present disclosure utilizes two electric motors ("E-motors"), an engine, and two planetary gear sets. In various exemplary embodiments, the planetary gear sets can include a dual-sun Ravigneaux-type gear set (DS-RGS), a dual-ring Ravigneaux-type gear set (DR-RGS), a three-sun. Ravigneaux-type gear set (TS-RGS), and a normal planetary gear set (PGS). The E-motors can be placed at the front end of the transmission, with one E-motor at the front and one in the middle between the gear sets, and with both E-motors in the middle between the gear sets.

Typically, PSTs require high installed E-motor and electronics power in order to support full load operation. With more modes and combinations of gears, those power requirements can be lowered. The present semi-power split hybrid transmission is designed to allow for minimum installed electrical power for reduced cost. The semi-power split transmission utilizes six well-distributed fixed gears for high and full load operation where gears are more efficient than modes. In the fixed gears, at least one E-motor is spinning, boosting, and regenerating. In part-load operation, the EVT modes are designed to support the engine and also allow either for small installed electrical power and also high efficiency.

Advantageously, the semi-power split transmission of the present disclosure provides multiple Electric Variable Transmission (EVT) modes for vehicle launch and for variable ratios to increase engine efficiency with load point shifting via the variable ratios. Additionally, the semi-power split transmission supports fixed gears. The transmission is configured to operate in fixed gears when the best transmission efficiency is required, such as at high loads, and in EVT modes when required, such as at light loads, to increase engine efficiency. The semi-power split transmission supports electric vehicle (EV) drive capability, full hybrid regeneration capability, and fixed gears similar to conventional transmissions for better efficiency at high and full load operation.

Advantageously, the semi-power split transmission with multiple modes and fixed gears requires lower E-motor power because at high loads fixed gears are used. Accordingly, the present disclosure provides full hybrid capabilities while minimize the E-motor size. As fixed gears are more efficient in high loads, the multi-mode power split transmission with fixed gears provides six well-distributed gears. EVT modes are used for light loads and vehicle launch and allow the omission of the torque converter. In both cases, E-motor power in the range of battery power is sufficient.

The semi-power split transmission is capable of utilizing fixed gears and modes at all possible loads. Fixed gears are more efficient in high load situations, therefore the semi-power split transmission includes efficient and well-distributed fixed gears. For light loads and vehicle launch, EVT modes are provided saving the torque converter. In either case, the present disclosure provides E-motor power in the range of battery power since for a hybrid vehicle, the lower limit for E-motor power is determined by battery power.

In one exemplary embodiment, the present disclosure provides a transmission with six forward gears which are laid out by varying planetary gear set ratios. In the various exemplary embodiments, the present disclosure utilizes dual-sun Ravigneaux-type gear sets (DS-RGS), dual-ring Ravigneaux-type gear sets (DR-RGS), three-sun Ravigneaux-type gear sets (TS-RGS), and normal planetary gear sets (PGS). All single and double shifts can be performed by shifting from one clutch or brake to another. In all gears, at least one E-motor is spinning offering the opportunity to boost with battery power or to regenerate energy to the battery.

The various exemplary embodiments of the multi-mode power split transmission with fixed gears are illustrated in various transmission schematic diagrams (also known as transmission stick diagrams). These schematic diagrams illustrate the topology, packaging, and location of planetary gear sets, clutches, motors, shafts, and the like. The schematic diagram is a visual representation of a cross-section of a transmission showing positioning and in what manner components are supported and interconnected. Additionally, the schematic diagrams show how various clutches and brakes are positioned and supported between or adjacent to planetary gear sets. Those of ordinary skill in the art recognize the schematic diagrams correspond to actual implementations of planetary gear sets, engines, clutches, and the like.

Referring to FIG. 1, in a first exemplary embodiment of the present disclosure, a semi-power split transmission 10a includes an engine 12, a first E-motor ("EMA") 14, a second E-motor ("EMB") 16, and a transmission output 18. The EMA 14 and EMB 16 are located in the middle of the semi-power split transmission 10a between a first dual-sun RGS 20 and a second dual-sun RGS 22. The dual-sun RGS 20 and 22 include a planetary carrier 24, a long set of planetary pinions 26, a short set of planetary pinions 28, a normal sun gear 30, a compound sun gear 32, and a ring gear 34. The planetary carrier 24 is common to the long and short set of planetary pinions 26 and 28. The long set of planetary pinions 26 have a smaller diameter, but longer length than the short set of planetary pinions 28. The long set of planetary pinions 26 mesh with the compound sun gear 32, and the short set of planetary pinions 28 mesh with the normal sun gear 30 and the long set of planetary pinions 26.

The semi-power split transmission 10a also includes three clutches 36, 38, and 40, three brakes 42, 44, and 46, and an overrunning clutch (OC) 48 which allow the spinning part of the OC 48 to spin only in the forward direction. The clutches 36, 38, and 40 and brakes 42, 44, and 46 are configured to selectively engage and disengage to select fixed gear ratios and EVT modes. For example, all single and double shifts can be performed by shifting from one clutch 36, 38, and 40 or brake 42, 44, and 46 to another. The clutches 36, 38, and 40 and brakes 42, 44, and 46 are configured to be selectively engaged, and can be operated mechanically, electrically, or hydraulically, as is known in the art. The OC 48 is utilized during engine 12 start, and can be omitted in lieu of an additional clutch (not shown) with hydraulic pressure or omitted at all and then an additional engine start device is required.

The engine 12 can include an internal combustion engine (ICE), for example. The EMA 14 has to be dimensioned to approximately 30% of engine 12 torque and 15% of engine 12 power. The EMB 16 has to be dimensioned to approximately 15% of engine 12 power and vehicle dependent torque requirements. For the first dual-sun RGS 20, the ring gear 34 connects to the engine 12 through an input shaft 50, the normal sun 30 connects to the EMA 14 and the brake 44, and the compound sun gear 32 connects to the OC 48 and the clutch 36. For the second dual-sun RGS 22, the ring gear 34 connects to the transmission output through an output shaft 52, the normal sun gear 30 connects to the EMB 16, clutches 36 and 38, and the brake 44, and the compound sun gear 32 connects to the clutch 38 and the brake 44. The planetary carrier 24 of the first dual-sun RGS 20 connects to the clutch 40 which connects to the planetary carrier 24 of the second dual-sun RGS 22. The brake 46 connects to the planetary carrier 24 of the RGS 22.

The brake 46 connects to a middle plate of the planetary carrier 24 of the second dual-sun RGS 22. The middle plate can be part of the planetary carrier 24 of the second dual-sun RGS 22. The brake 46 enables a reverse EVT mode and gear, and either improves reverse torque or allows for lowered maximum torque requirements of the EMB 16. Alternatively, the brake 44 could be located on the opposite side of the EMA 14. Also, the clutch 40 could lock other shafts of the second dual-sun RGS 22 for better packaging.

Figures 2A, 2B:
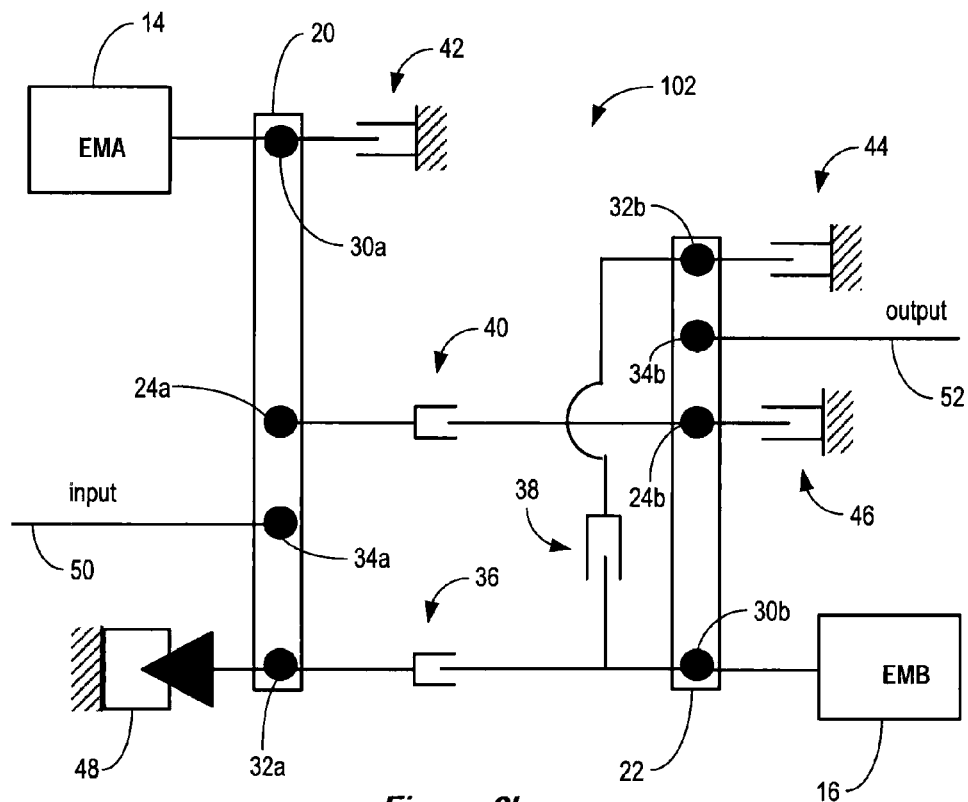
FIGS. 2a and 2b are a gear ratio table and a lever diagram, respectively, of the semi-power split transmission of FIG. 1.

Referring to FIGS. 2a and 2b, a gear ratio table 100 and a lever diagram 102 are illustrated for the semi-power split transmission 100a of FIG. 1. The gear ratio table 100 in FIG. 2a shows the six forward gears and how they can be shifted in terms of a combination of the associated clutches 36, 38, and 40 and brakes 42, 44, and 46 are engaged. The semi-power split transmission 10a includes gear ratios from 4.1 to 0.7, i.e. a mechanical spread of 5.5. The EMB 16 is configured to provide a torque ratio of 5.5. Also, the semi-power split transmission 10a has very low pinion speeds of a maximum of 1.6 in EVT modes and 1.5 in gears, relative to the engine 12 speed.

The semi-power split transmission 10a includes six well-distributed forward gears, five EVT modes, one reverse EVT mode, and one reverse gear. All single and double gear shifts are non-synchronous and clutch-to-clutch. In five out of the size forward gears, the EMA 14 is not spinning, i.e. when the brake 42 is engaged in gears FG1 through FG4 and FG6. Each of the EVT modes provides a range of variable ratios allowing the engine to operate in a sweet spot as opposed to fixed gears and their associated fixed gear ratio. While utilizing electric only drive, all members of the RGS 20 do not rotate, and the EMB 14 provides torque with two possible ratios of the RGS 22, such as 5.5 and 1.

In the semi-power split transmission 10a and in the other exemplary embodiments described herein, the clutches and brakes are used to physically engage the various fixed gears. With the EVT modes, two clutches are engaged for two degrees of freedom, i.e., input speed and ratio. With the fixed gears, three clutches are engaged for one degree of freedom, i.e., input speed (ratio is fixed). For example, in the semi-power split transmission 10a, three of the clutches 36, 38, and 40 and brakes 42, 44, and 46 are all used to engage the fixed gears as illustrated in table 100. The combination of the set of clutches 36, 38, and 40 and brakes 42, 44, and 46 yields to 6+1 gears and 5 EVT modes.

The various semi-power split transmissions 10 described herein include a control algorithm operable to perform a shift strategy to determine which gear or EVT mode to use. The algorithm utilizes the load and efficiency of the engine and transmission in order to decide between using an EVT mode or a fixed gear. In fixed gears, in an exemplary embodiment of the present disclosure of the semi-power split transmission 10, five gears support boost and regeneration with EMB 16 (e.g., gears one through four and six), and one gear supports boost and regeneration with both EMA 14 and EMB 16 (e.g., gear five). The five EVT modes include four input split modes and one compound split, and the reverse EVT mode can be one of the input split modes. Each of the EVT modes can operate in variable ratios with some of the modes having a larger range than the others. The semi-power split transmission configurations presented herein in FIGS. 7, 8, and 10 include less input split modes and more compound split modes.

The lever diagram 102 in FIG. 2b illustrates the semi-power split transmission 10a of FIG. 1 showing the arrangement of the RGS 20 and 22. The planetary carrier 24, normal sun gear 30, compound sun gear 32, and ring gear 34 are shown for each of the dual-sun RGS 20 and 22 with a prefix of "a" for the RGS 20 and of "b" for the RGS 22. To establish the first fixed gear (FG1), the clutch 36 and brakes 42 and 44 are engaged. To establish the second fixed gear (FG2), the clutch 40 and the brakes 42 and 44 are engaged. To establish the third fixed gear (FG3), both the clutches 36 and 40 and the brake 44 are engaged. To establish the fourth fixed gear (FG4), the clutches 38 and 40 and the brake 44 are engaged. To establish the fifth fixed gear (FG5), all the clutches 36, 38, and 40 are engaged. To establish the sixth fixed gear (FG6), the clutches 36 and 38 and the brake 44 are engaged. Finally to establish the reverse fixed gear (FG-R), the clutch 36 and the brakes 42 and 46 are engaged.

Figure 3:
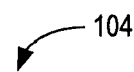
FIG. 3 is a mode clutch table of the semi-power split transmission illustrated in FIG. 1.

Referring to FIG. 3, a mode clutch table 104 is illustrated for the semi-power split transmission of FIG. 1. The mode clutch table 104 shows the five EVT forward modes and one EVT reverse mode when the associated clutches 36, 38, and 40 and brakes 42, 44, and 46 are engaged. For EVT modes, the brake 42 (which brakes the EMA 14) is not used so that, the EMA 14 can spin and generate or motor. Given the speed limits of the gear sets and the EMA 14 and EMB, each mode has a ratio range (like e.g. 1.5 to 3.4) in which it can be operated.

Figure 4:
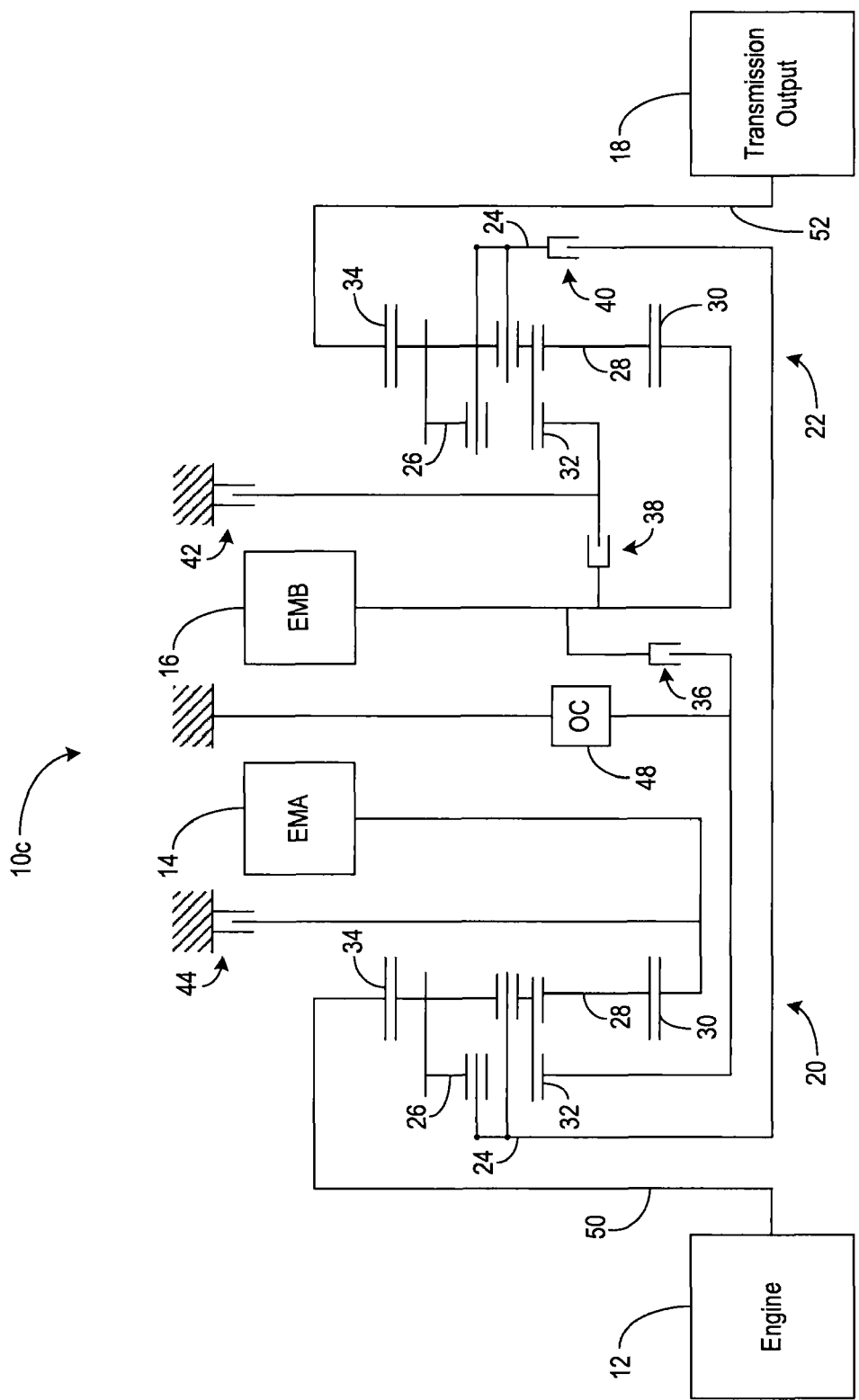
FIG. 4 is a schematic diagram of yet another exemplary embodiment a semi-power split transmission which is a variation of the semi-power split transmission illustrated in FIG. 1.

Referring to FIG. 4, in another exemplary embodiment of the present disclosure, a semi-power split transmission 10c includes the engine 12, the EMA 14, the EMB 16, and the transmission output 18. The semi-power split transmission 10c utilizes a similar layout as shown in FIG. 1 the semi-power split transmission 10a. Similar to the semi-power split transmission 10a, the semi-power split transmission 10c includes the EMA 14 and EMB 16 in the middle between the dual-sun RGSs 20 and 22. The semi-power split transmission 10b also includes the three clutches 36, 38, and 40, and two, brakes 42 and 44. The semi-power split transmission 10b excludes the third brake 46 included in the semi-power split transmission 10a.

With regards to the RGS 20 of the semi-power split transmission 10c, the ring gear 34 connects to the engine 12 through the input shaft 50, the normal sun 30 connects to the brake 44 and the EMA 14, the compound sun 32 connects to the OC 48 and the clutch 36, and the planetary carrier 24 connects to the clutch 40. With regards to the RGS 22 of the semi-power split transmission 10c, the ring gear 34 connects to the transmission output 18 through the output shaft 52, the normal sun 30 connects to the EMB 16 and the clutches 36 and 38, the compound sun 32 connects to the brake 42 and the clutch 38, and the planetary carrier 24 connects to the clutch 40.

Figure 5:
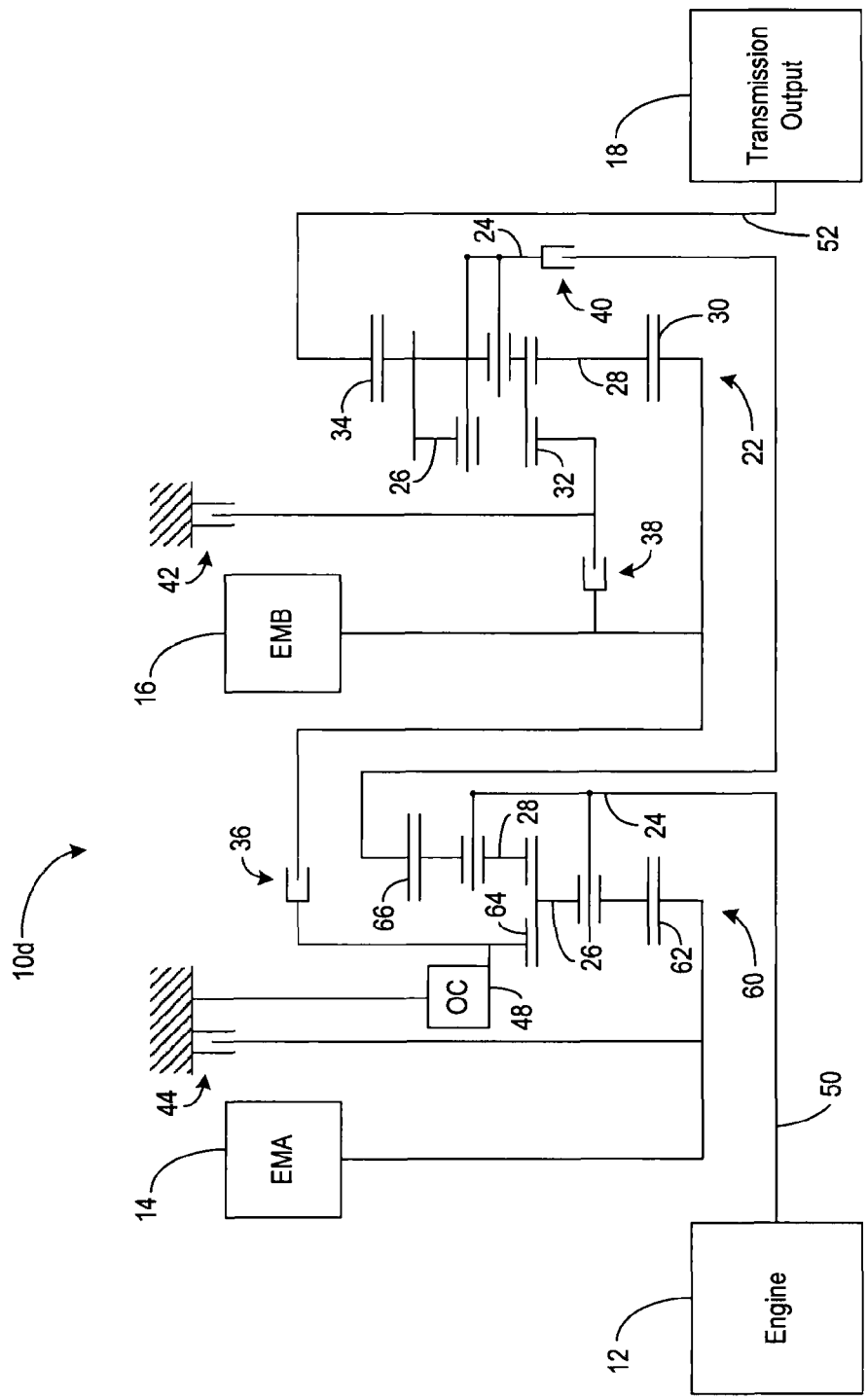
FIG. 5 is a schematic diagram of another exemplary embodiment of a semi-power split transmission including a first E-motor, a dual-ring RGS, a second E-motor, and a dual-sun RGS.

Referring to FIG. 5, in another exemplary embodiment of the present disclosure, a semi-power split transmission 10d includes the engine 12, the EMA 14, a dual-ring RGS 60, the EMB 14, the dual-sun RGS 22, and the transmission output 18. The semi-power split transmission 10d includes the EMA 14 at the front of the dual-ring RGS 60 and the EMB 14 in the middle between the RGS 60 and the RGS 22. The semi-power split transmission 10d also includes three clutches, 36, 38, and 40, two brakes 42 and 44, and one OC 48.

The dual-ring RGS 60 includes the planetary carrier 24, the long set of planetary pinions 26, the short set of planetary pinions 28, a sun gear 62, a normal ring gear 64, and a compound ring gear 66. The planetary carrier 24 is common to the long and short set of planetary pinions 26 and 28. The long set of planetary pinions 26 have a smaller diameter, but longer length than the short set of planetary pinions 28. The long set of planetary pinions 26 mesh with the sun gear 62 and the normal ring gear 64, and the short set of planetary pinions 28 mesh with the compound ring gear 66 and the long set of planetary pinions 26.

With regards to the RGS 60 of the semi-power split transmission 10d, the sun gear 62 connects to the EMA 14 and the brake 42, the normal ring gear 64 connects, to the OC 48 and the clutch 36, the compound ring gear 66 connects to the clutch 40, and the planetary carrier 24 connects to the engine 12 through the input shaft 50. With regards to the RGS 22 of the semi-power split transmission 10d, the ring gear 34 connects to the transmission output 18 through the output shaft 52, the normal sun gear 30 connects to the EMB 16 and the clutches 36 and 38, the compound sun 32 connects to the brake 42 and the clutch 38, and the planetary carrier 24 connects to the clutch 40.

Similar to the semi-power split transmissions 10a, 10b, and 10c, the semi-power split transmission 10d includes six forward gears which can be laid out by varying the ratios of the RGS 60 and 22. For example, it is possible to find ratios such that each gear step is smaller than the previous. Additionally, all single and double shifts can be performed by shifting from one of the clutches 36, 38, and 40 and/or brakes 42 and 44 to another. In all of the fixed gears, at least one of the EMA 14 and EMB 16 are spinning, offering the possibility to boost with battery power or to regenerate a battery.

By closing only the first brake 42, the semi-power split transmission 10d provides a good electric drive capability because only the EMB 16 and RGS 22 are spinning. The OC 48 permits the normal ring gear 64 of the RGS 60 to spin only in a forward direction allowing the engine 12 to be started without clutch pressure and seamless in an electric drive mode. Therefore, the EMA 14 requires very low torque for in the semi-power split transmission 10d. Also, at wide open throttle (WOT) race start, additional engine torque can be transmitted to the output, 18 by tugging with the clutch 40 and the brake 44.

The various exemplary embodiments of the semi-power split transmissions 10 of the present disclosure include four input split EVT modes and one compound split EVT mode which almost cover the whole ratio range. The EVT modes can be used for vehicle launch, omitting the need for a torque converter. The EVT modes also allow the transmission to vary the ratio at light loads in order to have overall higher powertrain efficiency.

Figure 6:
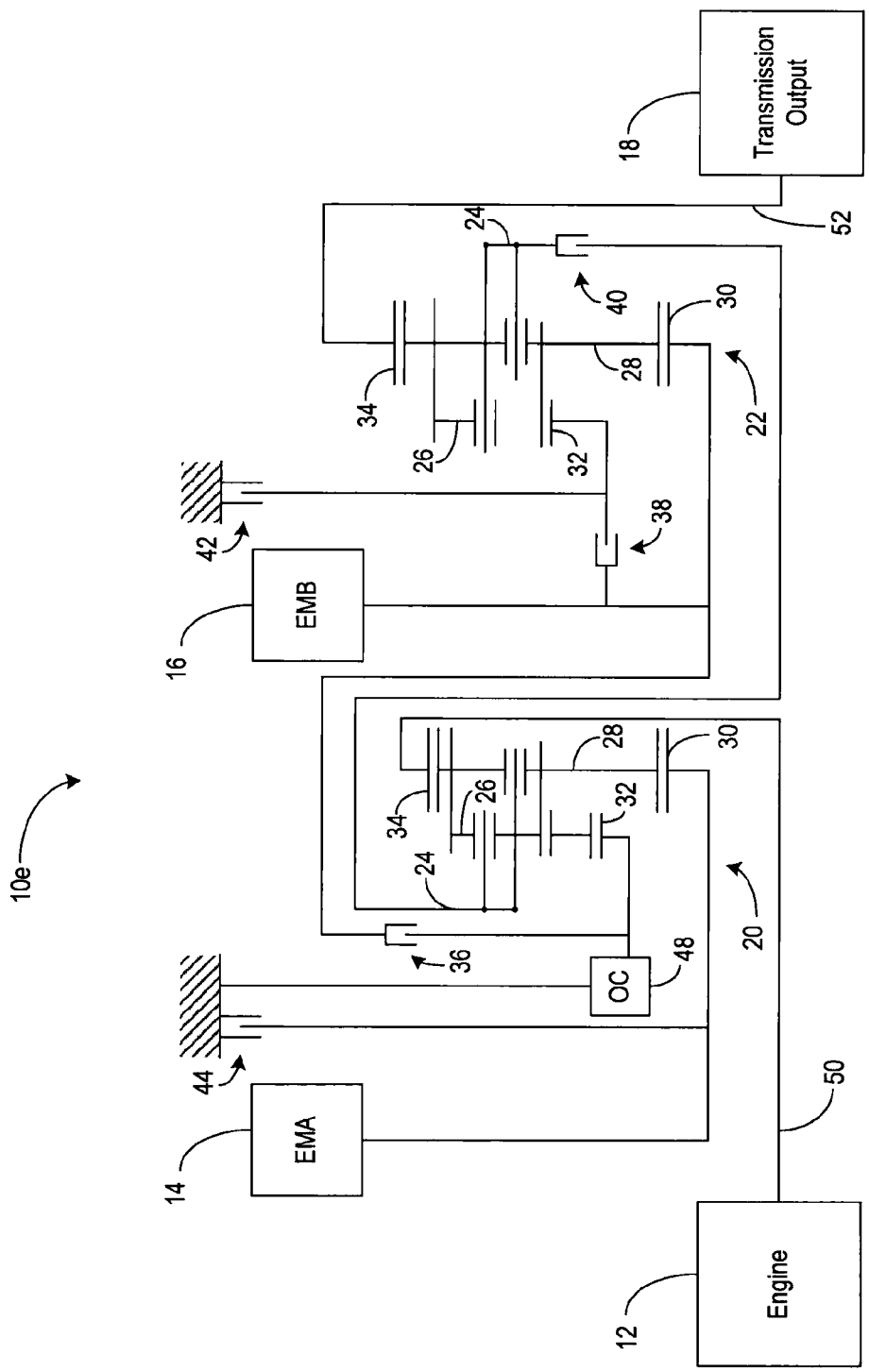
FIG. 6 is a schematic diagram of another exemplary embodiment of a semi-power split transmission which is a variation of the semi-power split transmission illustrated in FIG. 5 using a dual-sun RGS instead of the dual-ring RGS.

Referring to FIG. 6, in another exemplary embodiment of the present disclosure, a semi-power split transmission 10e includes the engine 12, the EMA 14, the first dual-sun RGS 20, the EMB 14, the second dual-sun RGS 22, and the transmission output 18. The semi-power split transmission 10e is similar to the semi-power split transmission 10d of FIG. 5, but instead utilizes similar RGS for each of the RGS 20 and 22 regarding the relative pinion sizes of the long and short set of planetary pinions 26 and 28. Advantageously, the RGS 20 and 22 can be the same. The semi-power split transmission 10e includes the same clutch 36, 38, and 40 and brake 42 and 44 as described herein with regards to the semi-power split transmission 10d of FIG. 5.

With regards to the RGS 20 of the semi-power split transmission 10e, the ring gear 34 connects to the engine 12 through the input shaft 50, the normal sun gear 30 connects to the EMA 14 and the brake 44, the compound sun gear 32 connects to the clutch 36 and the OC 48, and the planetary carrier 24 connects to the clutch 40. With regards to the RGS 22 of the semi-power split transmission 10e, the ring gear 34 connects to the transmission output 18 through the output shaft 52, the normal sun gear 30 connects to the EMB 16 and the clutches 36 and 38, the compound sun gear 32 connects to the brake 42 and the clutch 38, and the planetary carrier 24 connects to the clutch 40.

Figure 7:
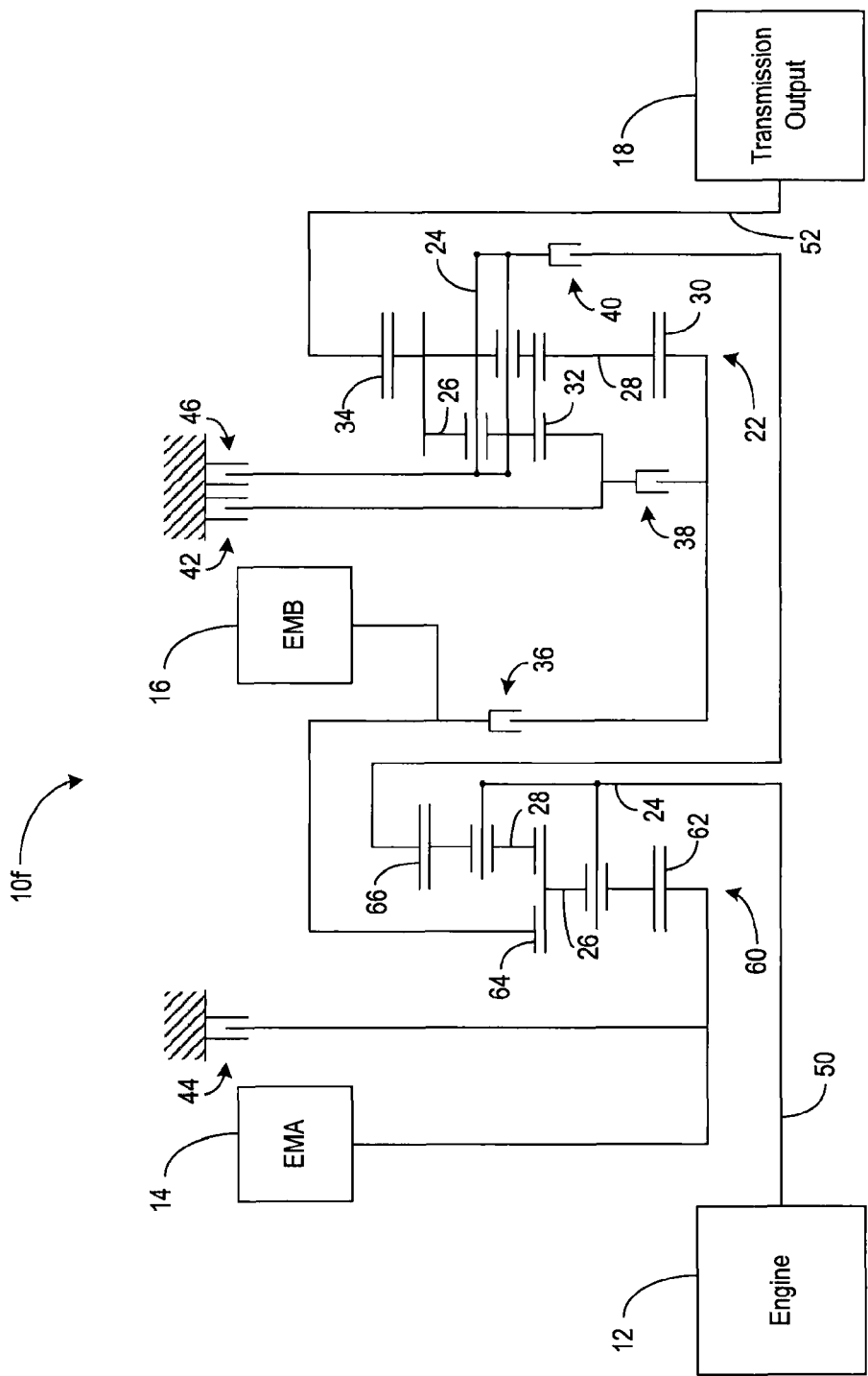
FIG. 7 is a schematic diagram of yet another exemplary embodiment of a semi-power split transmission which is a variation of the connections of the semi-power split transmission illustrated in FIG. 5.

Referring to FIG. 7, in yet another exemplary embodiment of the present disclosure, a semi-power split transmission 10f includes the engine 12, the EMA 14, the dual-ring RGS 60, the EMB 16, the dual-sun RGS 22, and the transmission output 18. The semi-power split transmission 10f is similar to the semi-power split transmission 10d of FIG. 5, but the EMB 16 is connected to the normal ring gear 64 of the RGS 60, allowing the engine to be started without the need for the OC 48. The semi-power split transmission 10f also includes the three clutches 36, 38, and 40, and three brakes 42, 44, and 46. The semi-power split-transmission 10f includes two input split EVT modes and three compound split EVT modes. The third brake 46 is included to improve reverse driving, and the brake 46 is locked only in reverse. For example, the brake 46 can include a locking clutch similar to a parking lock, and for improved synchronization, the brake 42 can be opened. Alternatively, if the EMB 16 has enough torque, then the brake 46 can be omitted.

With regards to the RGS 60 of the semi-power split transmission 10f, the sun gear 62 connects to the EMA 14 and the brake 44, the normal ring gear 64 connects to the EMB 16 and the clutch 36, the compound ring gear 66 connect to the clutch 40, and the planetary carrier 24 connects to the engine 12 through the input shaft 50. With regards to the RGS 22 of the semi-power split transmission 10f, the ring gear 34 connects to the transmission output 18 through the output shaft 52, the normal sun gear 30 connects to the clutches 36 and 38, the compound sun gear 32 connects to the brake 42 and the clutch 38, and the planetary carrier 24 connects to the brake 46 and the clutch 40.

Figure 8:
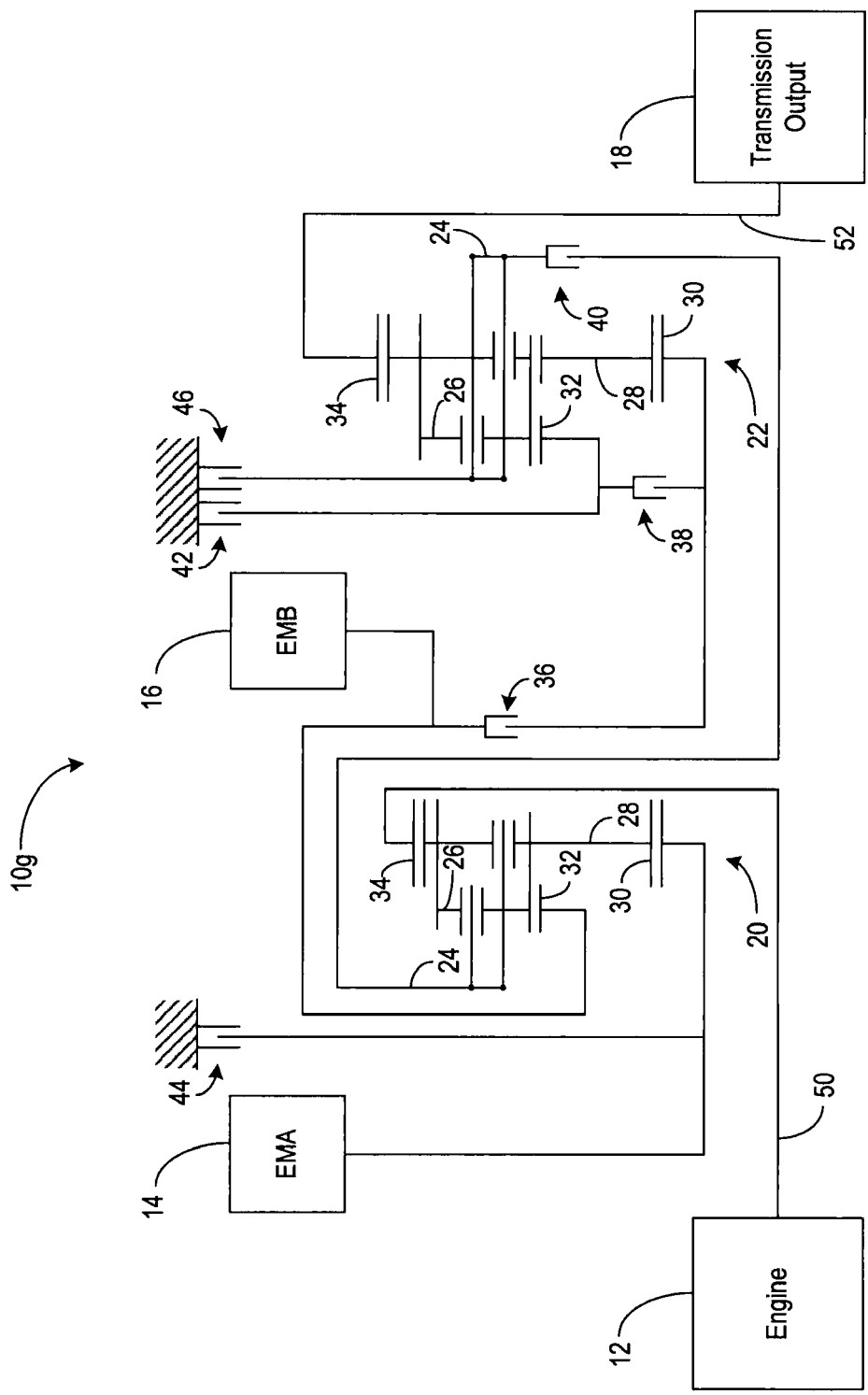
FIG. 8 is a schematic diagram of another exemplary embodiment of a semi-power split transmission which is a variation of the semi-power split transmission illustrated in FIG. 7 using a dual-sun RGS instead of the dual-ring RGS.

Referring to FIG. 8, in another exemplary embodiment of the present disclosure, a semi-power split transmission 10g includes the engine 12, the EMA 14, the dual-sun, RGS 20, the EMB 16, the dual-sun RGS 22, and the transmission output 18. The semi-power split transmission 10g is similar to the semi-power split transmission 10f of FIG. 7, however, the semi-power split transmission 10g includes two dual-sun RGSs 20 and 22 with relative pinion sizes of the long and short set of planetary pinions 26 and 28 similar in size. Advantageously, the RGSs 20 and 22 can be the same component, allowing for part re-use.

With regards to the RGS 20 of the semi-power split transmission 10g, the ring gear 34 connects to the engine 12 through the input shaft 50, the normal sun gear 30 connects to the EMA 14 and the brake 44, the compound sun gear 32 connects to the EMB 16 and the clutch 36, and the planetary carrier 24 connects to the clutch 40. With regards to the RGS 22 of the semi-power split transmission 10g, the ring gear 34 connects to the transmission output 18 through the output shaft 52, the normal sun gear 30 connects to the clutches 36 and 38, the compound sun gear 32 connects to the clutch 38 and the brake 42, and the planetary carrier 24 connects to the brake 46 and the clutch 40.

Figure 9:
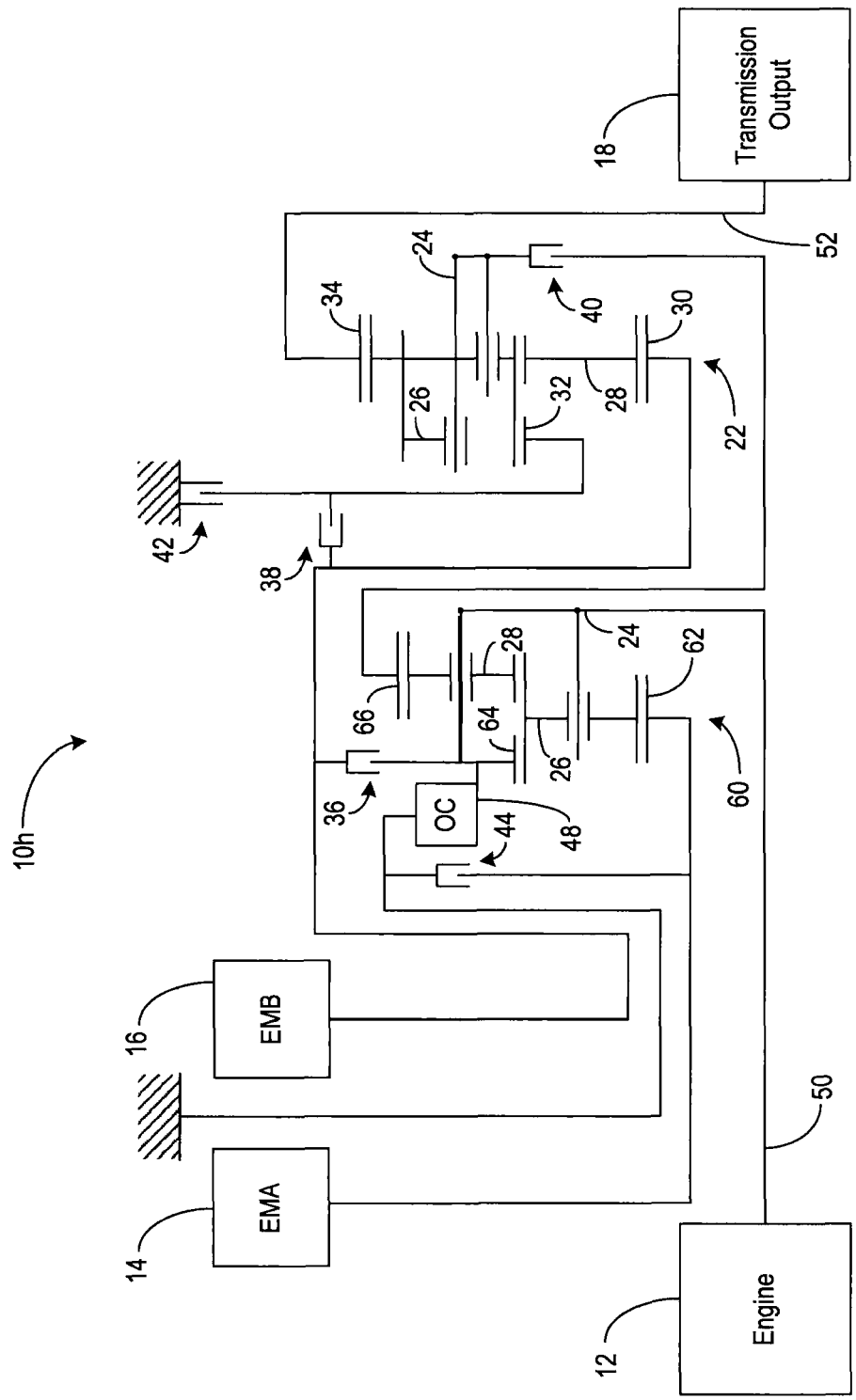
FIG. 9 is a schematic diagram of yet another exemplary embodiment of a semi-power split transmission which is a variation of the connections of the semi-power split transmission illustrated in FIG. 5 placing both E-motors at the front end of the transmission.

Referring to FIG. 9, in yet another exemplary embodiment, of the present disclosure, a semi-power split transmission 10h includes the engine 12, the EMA 14, the EMB 16, the dual-ring RGS 60, the dual-sun RGS 22, and the transmission output 18. The semi-power split transmission 10h is similar to the semi-power split transmission 10d in FIG. 5 except the EMA 14 and EMB 16 are located at the front end. Advantageously, this allows the EMA 14 and EMB 16 to be assembled and tested separately by an electric motor supplier saving assembly cost. Additionally, the semi-power split transmissions 10e, 10f, and 10g in FIGS. 6, 7, and 8, respectively, can also be designed with the EMA 14 and EMB 16 located at the front.

With regards to the RGS 60 of the semi-power split transmission 10h, the sun gear 62 connects to the brake 44 and the EMA 14, the normal ring gear 64 connects to the OC 48 and the clutch 36, the compound ring gear 66 connects to the clutch 40, and the planetary carrier 24 connects to the engine 12 through the input shaft 50. With regards to the RGS 22 of the semi-power split transmission 10h, the ring gear 34 connects to the transmission output 18 through the output shaft 52, the normal sun gear 30 connects to the clutches 36 and 38, the compound sun gear 32 connects to the brake 42 and the clutch 38, and the planetary carrier 24 connects to the clutch 40.

Figure 10:
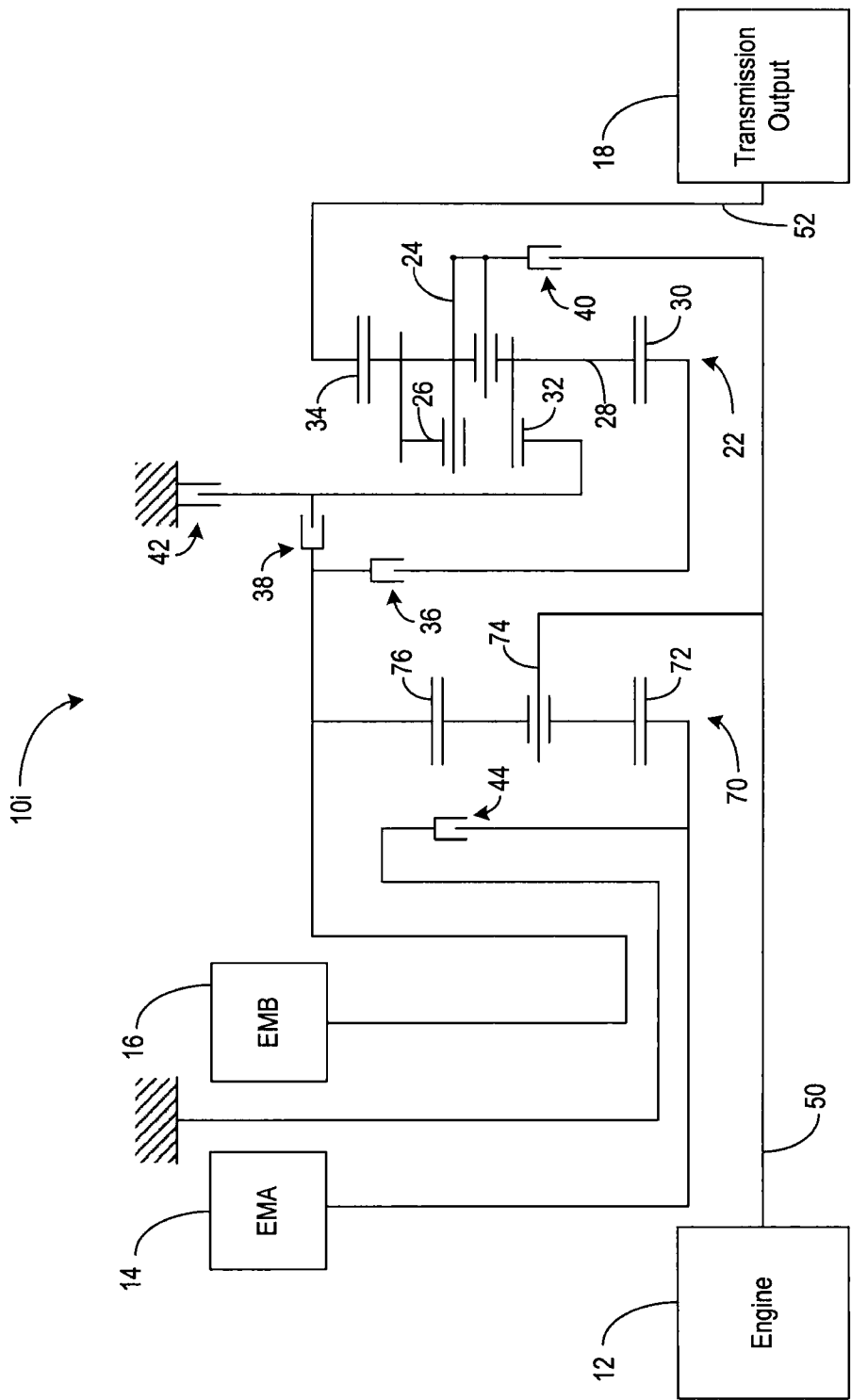
FIG. 10 is a schematic diagram of another exemplary embodiment of a semi-power split transmission including a planetary gear set (PGS) and a dual-sun RGS, and with E-motors at the front end of the transmission.

Referring to FIG. 10, in another exemplary embodiment of the present disclosure, a semi-power split transmission 10i includes the engine 12, the EMA 14, the EMB 16, a planetary gear set (PGS) 70, the dual-sun RGS 22, and the transmission output 18. In this embodiment, the first gear set includes a normal planetary gear set in lieu of the RGS in the other embodiments. The PGS 70 includes a sun gear 72, a planetary carrier 74, and a ring gear 76. The semi-power split transmission 10i also includes the three clutches 36, 38, and 40, and two brakes 42 and 44. The semi-power split transmission 10i provides six, fixed gears and four EVT modes. Additionally, the EMB 16 can also be located in the middle between the PGS 70 and the RGS 22.

With regards to the PGS 70 of the semi-power split transmission 10i, the sun gear 72 connects to the brake 44 and the EMA 14, the engine 12 connects to the planetary carrier 74 and the clutch 40 through the input shaft 50, the ring gear 76 connects to the EMB 16 and the clutches 36 and 38. With regards to the RGS 22 of the semi-power split transmission 10i, the ring gear 34 connects to the transmission output 18 through the output shaft 52, the normal sun gear 30 connects to the clutch 36, the compound sun gear 32 connects to the clutch 38 and the brake 42, and the planetary carrier, 24 connects to the clutch 40.

Figure 11:
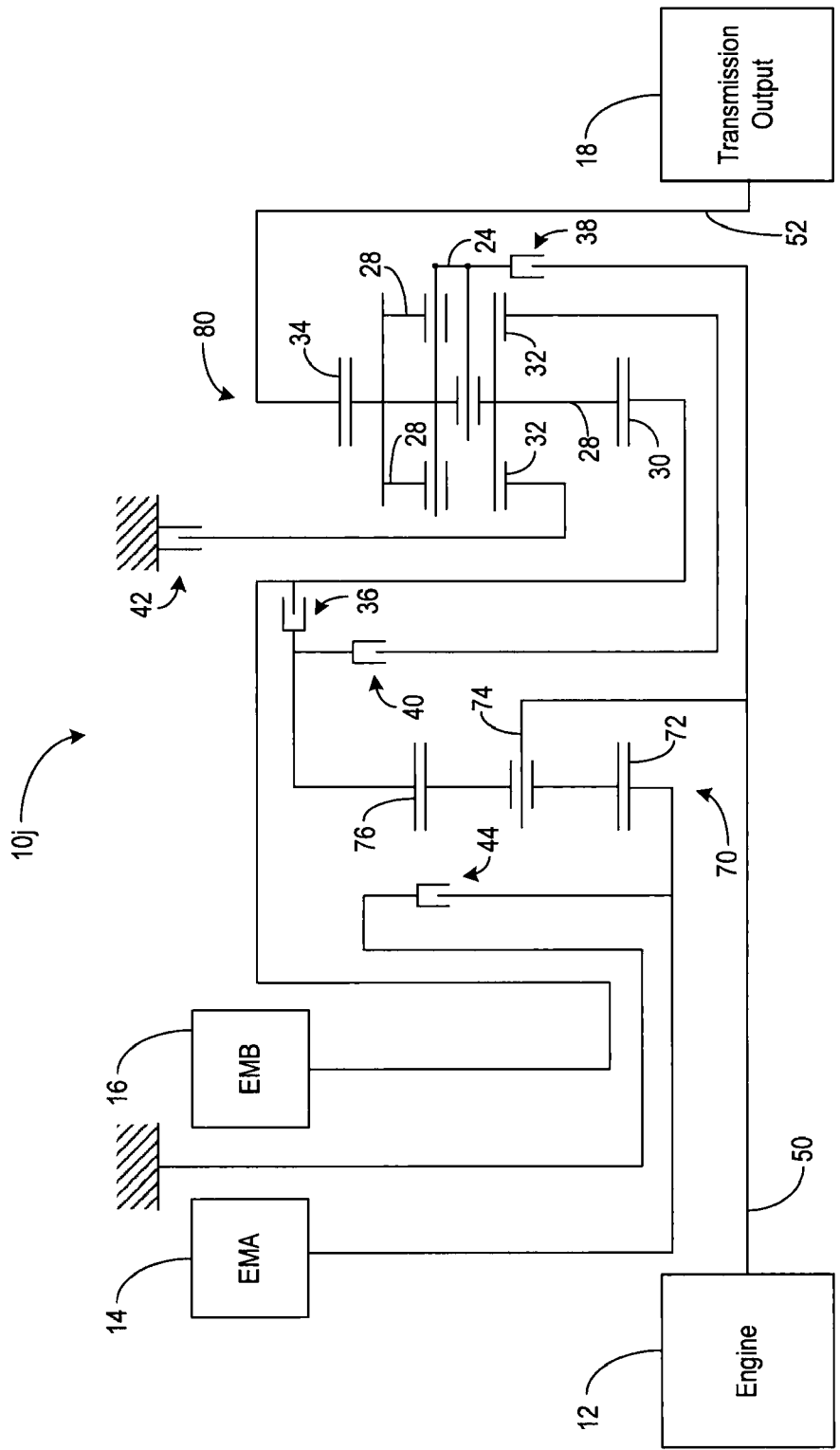
FIG. 11 is a schematic diagram of another exemplary embodiment of a semi-power split transmission which is a variation of the connections of the semi-power split transmission illustrated in FIG. 10.

Referring to FIG. 11, in yet another exemplary embodiment of the present disclosure, a semi-power split transmission 10j includes the engine 12, the EMA 14, the EMB 16, the PGS 70, a three-sun RGS 80, and the transmission output 18. The semi-power split transmission 10j is similar to the semi-power split transmission 10i in FIG. 10 except the EMB 16 is connected to the normal sun 32 of the RGS 80. As a consequence, the short set of planetary pinions 28 in the RGS 80 are extended towards the transmission output 18 in order to mesh with an additional compound sun gear 32 that is connection to the clutch 40. Additionally, the EMB 16 can be places in the middle between the PGS 70 and the RGS 80.

With regards to the PGS 70 of the semi-power split transmission 10j, the sun gear 72 connects to the EMA 14 and the brake 44, the ring gear connects to the clutches 36 and 40, and the planetary carrier 74 connects to the engine 12 through the input shaft 50 and the clutch 38. With regards to the RGS 80 of the semi-power split transmission 10j, the ring gear 34 connects to the transmission output 18 through the output shaft 52, the normal sun gear 30 connects to the EMB 16 and the clutch 36, the first compound sun gear 32 connects to the brake 42, the second compound sun gear 32 connects to the clutch 40, and the planetary carrier 24 connects to the clutch 38.

Figure 12:
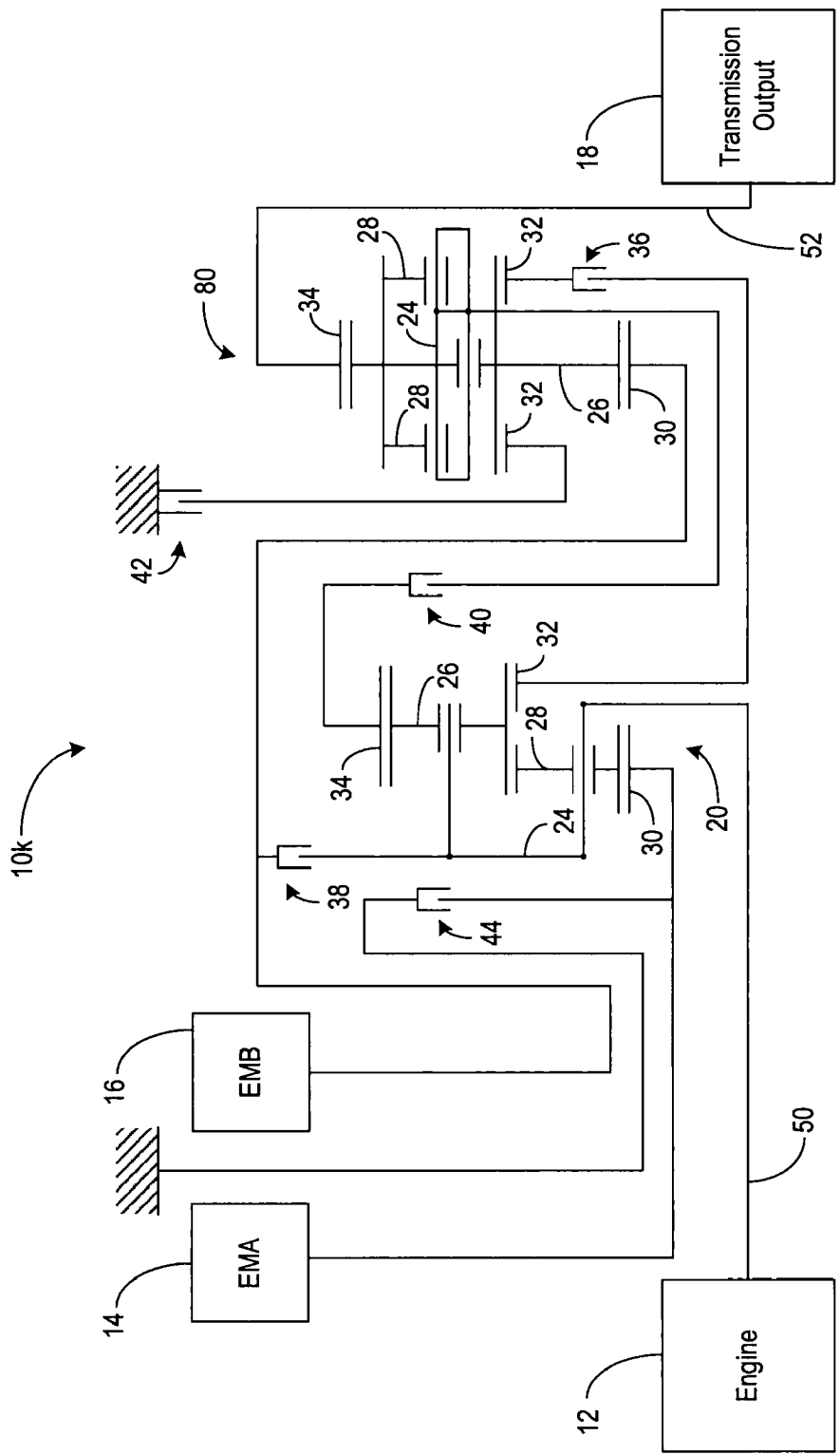
FIG. 12 is a schematic diagram of another exemplary embodiment of a semi-power split transmission which is a variation of the semi-power split transmission illustrated in FIG. 10 and includes a dual-sun RGS and a three-sun RGS.

Referring, to FIG. 12, in another exemplary embodiment of the present disclosure, a semi-power split transmission 10k includes the engine 12, the EMA 14, the EMB 16, the dual-sun RGS 20, the three-sun RGS 80, and the transmission output 18. The semi-power split transmission 10k is similar to the semi-power split transmission 10j in FIG. 11 except the RGS 20 is included in lieu of the PGS 70. The semi-power split transmission 10k also includes the three clutches 36, 38, and 40, and two brakes 42 and 44. The ring gear 34 of the RGS 20 is connected to the planetary carrier 24 of the RGS 80. Additionally, the EMB 16 can be places in the middle between the RGS 22 and the RGS 80.

With regards to the RGS 20 of the semi-power split transmission 10k, the ring gear 34 connects to the clutch 40, the normal sun gear 30 connects to the brake 44 and the EMA 14, the compound sun gear 32 connects to the clutch 36, and the planetary carrier 24 connects to the clutch 38 and the engine 12 through the input shaft 50. With regards to the RGS 80 of the semi-power split transmission 10k, the ring gear 34 connects to the transmission output 18 through the output shaft 52, the normal sun gear 30 connects to the EMB 16 and the clutch 38, the first compound sun gear 32 connects to the brake 42, the second compound sun gear 32 connects to the clutch 36, and the planetary carrier 24 connects to the clutch 38 and the EMB 16.

Figure 13:
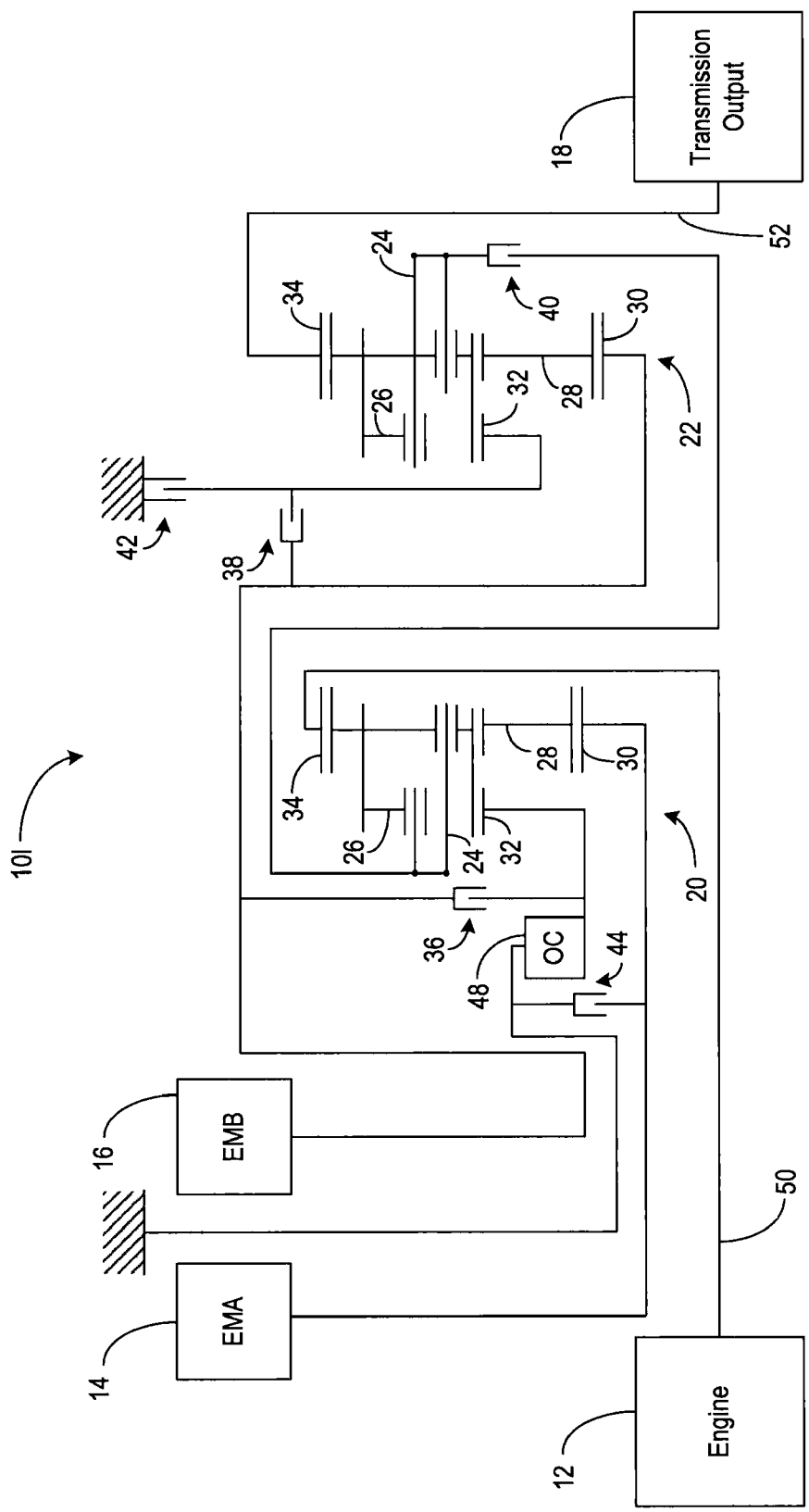
FIG. 13 is a schematic diagram of yet another exemplary embodiment of a semi-power split transmission including two E-motors in the front of the transmission and two dual-sun RGS.

Referring to FIG. 13, in still another exemplary embodiment of the present disclosure, a semi-power split transmission 10l includes the engine 12, the EMA 14, the EMB 16, the RGS 20, the RGS 22, and the transmission output 18. The semi-power split transmission 10l includes three clutches 36, 38, and 40, two brakes 42 and 44, and the OC 48. The EMA 14 and EMB 16 are located at the front end. Advantageously, this allows the EMA 14 and EMB 16 to be assembled and tested separately by an electric motor supplier saving assembly cost.

With regards to the RGS 20 of the semi-power split transmission 10*l*, the ring gear 34 connects to the engine 12 through the input shaft 50, the normal sun gear 30 connects to the brake 44 and the EMA 14, the compound sun gear 32 connects to the clutch 36 and the OC 48, and the planetary carrier 24 connects to the clutch 40. With regards to the RGS 22 of the semi-power split transmission 10*l*, the ring gear 34 connects to the transmission output 18 through the output shaft 52, the normal sun gear 30 connects to the clutches 36 and 38 and the EMB 16, the compound sun gear 32 connects to the clutch 38 and the brake 42, and the planetary carrier 24 connects to the clutch 40.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A semi-power split hybrid transmission capable of operation in a plurality of Electric Variable Transmission modes and with fixed gears, comprising: an engine connected to an input shaft;
    a first planetary gear set and second planetary gear set connected to: a first and second electric motor;
    the input shaft;
    a first and second selectively engageable brake; and
    a first, second, and third selectively engageable clutch;
    an output shaft connected to the second planetary gear set;
    wherein the first and second electric motors are disposed before the first planetary gear set, and
    wherein at least one of the first planetary gear set and second planetary gear set comprise a compound planetary gear set and the output shaft is directly connected to the at least one compound planetary gear set.

2. The semi-power split hybrid transmission of claim 1, further comprising an overrunning clutch;
    wherein the first planetary gear set comprises a sun gear, a compound ring gear, a normal ring gear, a first long set of planetary pinions meshing with the sun gear and the normal ring gear, a first short set of planetary pinions meshing with the compound ring gear and the first long set of planetary pinions, and a first planetary carrier common to both the first long and short set of planetary pinions;
    wherein the second planetary gear set comprises a normal sun gear, a compound sun gear, a ring gear, a second long set of planetary pinions meshing with the compound sun gear, a second short set of planetary pinions meshing with the normal sun gear and the second long set of planetary pinions, and a second planetary carrier common to both the second long and short set of planetary pinions; and
    wherein connections in the semi-power split hybrid transmission comprise: the sun gear connected to the first selectively engageable brake and the first electric motor;
    the normal ring gear connected to the overrunning clutch and the first selectively engageable clutch;
    the compound ring gear connected to the second selectively engageable clutch; the first planetary carrier connected to the input shaft;
    the sun gear connected to the second electric motor and the first and third selectively engageable clutches;
    the compound sun gear connected to the second selectively engageable brake and the third selectively engageable clutch;
    the ring gear connected to the output shaft; and
    the second planetary carrier connected to the second selectively engageable clutch.

3. The semi-power split hybrid transmission of claim 1, wherein the first planetary gear set comprises a sun gear, a ring gear, and a set of planetary pinions meshing with the sun and ring gears, and a first planetary carrier;
    wherein the second planetary gear set comprises a normal sun gear, a compound sun gear, a ring gear, a long set of planetary pinions meshing with the compound sun gear, a short set of planetary pinions meshing with the normal sun gear and the long set of planetary pinions, and a second planetary carrier common to both the long and short set of planetary pinions; and
    wherein connections in the semi-power split hybrid transmission comprise: the sun gear connected to the first selectively engageable brake and the first electric motor;
    the ring gear connected to the second electric motor and the first and third selectively engageable clutches;
    the first planetary carrier connected to the input shaft;
    the normal sun gear connected to the first selectively engageable clutch;
    the compound sun gear connected to the second selectively engageable brake and the third selectively engageable clutch;
    the ring gear connected to the output shaft; and
    the second planetary carrier connected to the second selectively engageable clutch.

4. The semi-power split hybrid transmission of claim 1, wherein the first planetary gear set comprises a sun gear, a ring gear, and a set of planetary pinions meshing with the sun and ring gears, and a first planetary carrier;
    wherein the second planetary gear set comprises a normal sun gear, a first compound sun gear, a second compound sun gear, a ring gear, a long set of planetary pinions meshing with the first and second compound sun gears, a short set of planetary pinions meshing with the normal sun gear and the long set of planetary pinions, and a second planetary carrier common to both the long and short set of planetary pinions; and
    wherein connections in the semi-power split hybrid transmission comprise: the sun gear connected to the first selectively engageable brake and the first electric motor;
    the ring gear connected to the first and third selectively engageable clutches;
    the first planetary carrier connected to the input shaft and the second selectively engageable clutch;
    the normal sun gear connected to the second electric motor and the third selectively engageable clutch;
    the first compound sun gear connected to the second selectively engageable brake; the second compound sun gear connected to the second selectively engageable clutch; the ring gear connected to the output shaft and the second planetary carrier connected to the second selectively engageable clutch.

5. The semi-power split hybrid transmission of claim 1, wherein the first planetary gear set comprises a first normal sun gear, a first compound sun gear, a first ring gear, a first long set of planetary pinions meshing with the first compound sun gear, a first short set of planetary pinions meshing with the first normal sun gear and the first long set of planetary pinions, and a first planetary carrier common to both the first long and short set of planetary pinions;

wherein the second planetary gear set comprises a second normal sun gear, a second and third compound sun gear, a second ring gear, a second long set of planetary pinions meshing with the second and third compound sun gears, a second short set of planetary pinions meshing with the second normal sun gear and the second long set of planetary pinions, and a second planetary carrier common to both the second long and short set of planetary pinions; and wherein connections in the semi-power split hybrid transmission comprise: the first normal sun gear connected to the first selectively engageable brake and the first electric motor;

the first compound sun gear connected to the second selectively engageable clutch; the first ring gear connected to the third selectively engageable clutch;

the first planetary carrier connected to the first selectively engageable clutch;

the second normal sun gear connected to the second electric motor and the first selectively engageable clutch;

the second compound sun gear connected to the second selectively engageable brake; the third compound sun gear connected to the second selectively engageable clutch; the second ring gear connected to the output shaft; and the second planetary carrier connected to the third selectively engageable clutch.

6. The semi-power split hybrid transmission of claim 1, further comprising an overrunning clutch; and wherein the first planetary gear set comprises a first normal sun gear, a first compound sun gear, a first ring gear, a first long set of planetary pinions meshing with the first compound sun gear, a first short set of planetary pinions meshing with the first normal sun gear and the first long set of planetary pinions, and a first planetary carrier common to both the first long and short set of planetary pinions;

wherein the second planetary gear set comprises a second normal sun gear, a second compound sun gear, a second ring gear, a second long set of planetary pinions meshing with the second compound sun gear, a second short set of planetary pinions meshing with the second normal sun gear and the second long set of planetary pinions, and a second planetary carrier common to both the second long and, short set of planetary pinions; and wherein connections in the semi-power split hybrid transmission comprise: the first normal sun gear connected to the first selectively engageable brake and the first electric motor;

the first compound sun gear connected to the first selectively engageable clutch and the overrunning clutch;

the first ring gear connected to the input shaft;

the first planetary carrier connected to the second selectively engageable clutch;

the second normal sun gear connected to the second electric motor and the first and third selectively engageable clutches;

the second compound sun gear connected to the second selectively engageable brake and the third selectively engageable clutch;

the second ring gear connected to the output shaft; and the second planetary carrier connected to the second selectively engageable clutch.

7. A semi-power split hybrid transmission capable of operation in a plurality of Electric Variable Transmission modes and with fixed gears, comprising: an engine connected to an input shaft;

a first planetary gear set and second planetary gear set connected to: a first and second electric motor;

the input shaft;

a first and second selectively engageable brake; and a first, second, and third selectively engageable clutch;

an output shaft connected to, the second planetary gear set;

wherein the first and second electric motors are disposed before the first planetary gear set;

wherein the first planetary gear set comprises a sun gear, a ring gear, and a set of planetary pinions meshing with the sun and ring gears, and a first planetary carrier;

wherein the second planetary gear set comprises a normal sun gear, a compound sun gear, a ring gear, a long set of planetary pinions meshing with the compound sun gear, a short set of planetary pinions meshing with the normal sun gear and the long set of planetary pinions, and a second planetary carrier common to both the long and short set of planetary pinions; and wherein connections in the semi-power split hybrid transmission comprise: the sun gear connected to the first selectively engageable brake and the first electric motor;

the ring gear connected to the second electric motor and the first and third selectively engageable clutches;

the first planetary carrier connected to the input shaft;

the normal sun gear connected to the first selectively engageable clutch;

the compound sun gear connected to the second selectively engageable brake and the third selectively engageable clutch;

the ring gear connected to the output shaft; and the second planetary carrier connected to the second selectively engageable clutch.

* * * * *